| United States Patent [19] | [11] Patent Number: 4,873,310 |
| Bartmann et al. | [45] Date of Patent: Oct. 10, 1989 |

[54] AROMATIC POLYAMIDES BASED ON PHENOXYTEREPHTHALIC ACID AND PROCESS FOR PREPARING THEM

[75] Inventors: Martin Bartmann, Recklinghausen, Fed. Rep. of Germany; Naoki Ikeda, Himeji, Japan

[73] Assignees: Huls Aktiengesellschaft, Marl, Fed. Rep. of Germany; Daicel Chemical Industries, Ltd., Tokyo, Japan

[21] Appl. No.: 162,968

[22] Filed: Mar. 2, 1988

[30] Foreign Application Priority Data

Mar. 7, 1987 [DE] Fed. Rep. of Germany ....... 3707435

[51] Int. Cl.$^4$ ............................................. C08G 69/32
[52] U.S. Cl. ..................................... 528/208; 528/176; 528/179; 528/182; 528/183; 528/206; 528/207; 528/347; 528/348
[58] Field of Search ............... 528/208, 206, 207, 176, 528/179, 182, 183, 347, 348

[56] References Cited

U.S. PATENT DOCUMENTS 2,902,475 9/1959 Burkhard ........................... 528/208
3,554,971 1/1971 Jones et al. ........................ 528/208

*Primary Examiner*—Harold D. Anderson
*Attorney, Agent, or Firm*—Oblon, Spivak, McClelland, Maier & Neustadt

[57] ABSTRACT

Aromatic polyamides based on phenoxyterephthalic acid and a process for preparing them. Polyamides and copolyamides based on phenoxyterephthalic acid are resistant to chemicals and can be processed as thermoplastics with no problems.

3 Claims, No Drawings

AROMATIC POLYAMIDES BASED ON PHENOXYTEREPHTHALIC ACID AND PROCESS FOR PREPARING THEM

BACKGROUND OF THE INVENTION

1. Field of the Invention

Aromatic polyamides are distinguished by high temperature resistance and good mechanical properties. They are used especially for the production of fibers and films (see Elias/Vohwinkel, "New Polymeric Materials for Industrial Use", Series 2, Carl Hanser Verlag 1983, pages 242 ff.).

2. Discussion of the Background

The industrially available products based on aromatic dicarboxylic acids and aromatic diamines do not yet adequately meet the requirements of the trade. Thus, the polyamides based on terephthalic acid and para-phenylenediamine or isophthalic acid and metaphenylenediamine, such as Kevlar ® and Nomex ®, for example, do indeed have a high glass transition temperature; however, they can only be melted with decomposition. It is therefore impossible to process these products by injection molding, i.e., they cannot be processed as thermoplastics. Finally, there is a great drawback in the fact that these polyamides are soluble only in sulfuric acid or a few special polar aprotic solvents such as N-methylpyrrolidone, for example, with the addition of inorganic salts such as lithium or calcium chloride.

Processes for the production of aromatic polyamides are known. A good overview can be obtained, for example, from British Patent 1,547,802; J. Poly. Sci., B, 2-4, 369 (1964), and J. Poly. Sci., Poly. Chem. Ed., 24, 701 (1986). These processes basically suffer from the same defects that were mentioned above. Thus, European Patent Application Disclosure No. 0 099 997 does describe the direct preparation in solution, but the reaction times are extraordinarily long, the products are of poor color quality, and the achievable molecular weights are low. On the other hand, the process of German Patent Application Disclosure No. 35 26 622 represents an improvement. However, both processes describe only the preparation of aromatic polyamides that cannot be processed as thermoplastics.

The known amorphous polyamides based on aromatic dicarboxylic acids and aliphatic diamines also do not yet adequately meet the requirements of the trade (for example, see German Patent No. 26 42 244; U.S. Pat. No. 4,369,305; and European Patent No. 0 053 876). It is therefore required to use mixtures of dicarboxylic acids such as terephthalic and isophthalic acid, for example. However, there are still problems even when mixtures are used. In the case of mixtures with a high proportion of isophthalic acid, the glass transition temperature Tg is too low. Conversely, the polyamides with high proportions of terephthalic acid are partially crystalline and no longer transparent. Therefore, it is necessary for their preparation to use specially formulated mixtures of diamines and/or dicarboxylic acids. In occasional cases it is necessary to add lactams or omega-aminocarboxylic acids during the preparation (see U.S. Pat. Nos. 3,150,117; 4,369,305; 3,840,501; 3,842,405; and 4,028,476; German Patent Application Disclosure Nos. 21 56 723; 26 42 244; 29 36 750; and 36 00 015, as well as European Patent Application Disclosure No. 53 876, and Angew. Makromol. Chem. 98, 225 (1981).

SUMMARY OF THE INVENTION

Accordingly, one object of the present invention is to provide aromatic and aromatic-aliphatic polyamides and copolyamides with improved properties.

Another object of the invention is to provide a method of preparing these polyamides and copolyamides which is simple and economical.

These and other objects of the invention which will become apparent from the following specification have been achieved by the present polyamides which have structural units of the formula —(CO—Ar—CO—NH—R—NH)— in which Ar stands for a difunctional group of the formula

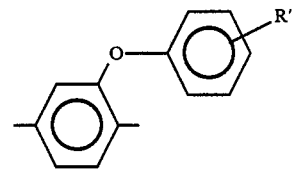

in which R is a straight-chain, branched or cyclic alkyl group with 2-20 carbon atoms or a difunctional aromatic group of the formula

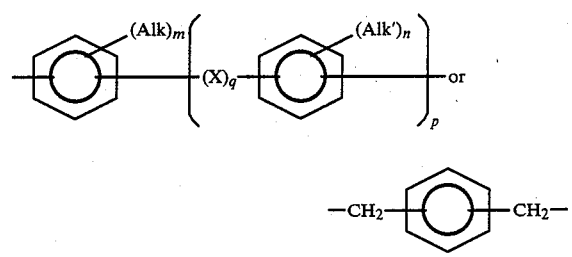

wherein Alk and Alk' are, independently, alkyl groups with up to 6 carbon atoms, X is a difunctional group selected from the group consisting of —O—, —S—, —CH$_2$—, —CH(CH$_3$)$_2$—, —CO—, and —SO$_2$—, and p and q are, independently, 0 or 1, an m and n are, independently, 0, 1 or 2, and in which R' is hydrogen, a halogen, an alkyl, aryl, alkoxy, or aryloxy group, each with up to 12 carbon atoms.

The invention also comprises a process of preparing the polyamides noted above by reacting the corresponding diamines and dicarboxylic acid in solution at a temperature between 150°-300° C. in the presence of a catalyst containing phosphorous.

DETAILED DESCRIPTION OF THE PREFERRED EMBODMENTS

One purpose of this invention to make available aromatic and aromatic-aliphatic polyamides and copolyamides with improved properties. It has now been found that such polymers are obtained when a phenoxyterephthalic acid is used as the acid component and diamines of the formula NH$_2$—R—NH$_2$ are used as amino component starting materials, with R standing for a straight-chained, branched, or cyclic alkylene group with 2 to 20 carbon atoms, or a difunctional aromatic group of the general formula

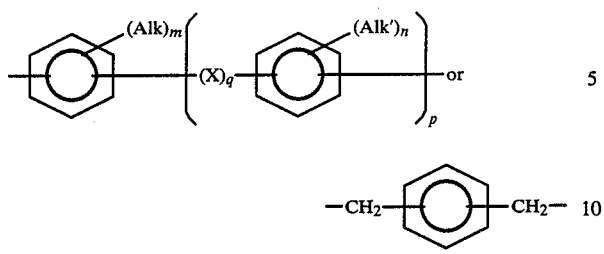

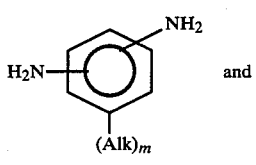

Alk and Alk' stand for identical or different alkyl groups with up to 6 carbon atoms. X stands for the difunctional groups —O—, —S—, —CO—, —CH$_2$—, —C(CH$_3$)$_2$—, or —SO$_2$—, p and q are 0 or 1 independently of one another, and m and n are 0 or 1 or 2 independently of one another.

The phenoxyterephthalic acid has the formula shown below.

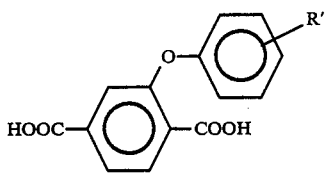

In the formula, R' stands for hydrogen, a halogen such as chlorine, for example, or an alkyl aryl, alkyloxy, or aryloxy group, each with up to 12 carbon atoms.

The object of the invention is also the procedures for preparing these polyamides and copolyamides. These are distinguished by the fact that the diamines and the dicarboxylic acids are reacted in solution at elevated temperature in the presence of catalysts. The diamines and dicarboxylic acid dichlorides can also be used as the starting materials.

The polyamides based on aliphatic diamines can also be prepared by conventional melt polycondensation and by reaction of the diamines with the dicarboxylic acid dichlorides at low temperature.

The following benefits are produced by the invention. The polyamides and copolyamides based on aromatic diamines not only are resistant to water and chemicals and have a high softening point, as is known with similar compounds; but, they can also be processed as thermoplastics.

The polyamides based on aliphatic diamines are always amorphous and easily processed. The melting point is below the temperature of decomposition.

This invention opens the way to amorphous aromatic-aliphatic polyamides and copolyamideds with glass transition temperature up to 220° C., that have not been available in the art, or have been available only in complicated mixtures.

The process is distinguished by its simplicity.

Phenoxyterephthalic acid is a readily available substance (see J. Poly. Sci., Poly. Chem. Ed., 18 3069 (1980). The substituted phenoxyterephthalic acids, for example, can be prepared easily by the reaction of nitrophthalic acid with the appropriately substituted phenols.

Examples that may be mentioned of diamines that can be used pursuant to the invention are aliphatic diamines with 2 to 20 carbon atoms, which can be straight chain or branched, such as for example hexamethylenediamine, 2,2,4-trimethylhexamethylenediamine, cycloaliphatic diamines, for example such as isophoronediamine and bis(p-aminocyclohexyl)methane, mononuclear aromatic diamines of the formulas

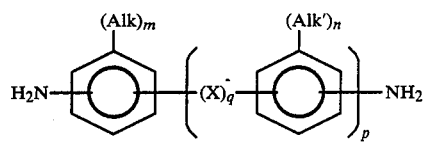

in which m=0 or 1, such as m-phenylenediamine, for example, binuclear aromatic diamines of the formula

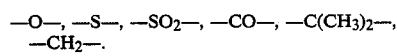

with p or q=0 or 1 and m and n=0, 1, or 2. Alk and Alk' stand for two identical or different alkyl groups with a maximum of 6 carbon atoms. X stands for the following difunctional groups:

—O—, —S—, —SO$_2$—, —CO—, —C(CH$_3$)$_2$—, —CH$_2$—.

As an example, 4-4'-diaminodiphenyl ether can be mentioned. Preferred are hexamethylenediamine and mxylylenediamine, bis(p-aminocyclohexyl)methane, mphenylenediamine, and their mixtures.

The polyamides can be prepared by the following procedures:

1. Condensation in solution

Approximately equimolar quantities of the two starting materials are reacted in a polar aprotic solvent in the presence of a phosphorus catalyst and optionally a cocatalyst based on a 4-dialkylaminopyridine.

The phosphorus catalyst includes compounds of the types PZ$_5$, PZ$_3$, HPZ$_2$, and the anhydrides P$_2$O$_5$ and P$_2$O$_3$. Z stands for a halogen such as chlorine or bromine, the OH group, the OAr group in which Ar is an optionally alkyl-substituted phenyl group, or the alkoxy group with 1 to 10 carbon.atoms. Examples that may be mentioned are phosphoric acid, hypophosphorous acid, and triphenyl phosphite.

The 4-dialkylaminopyridines used as cocatalysts have the structure

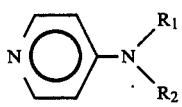

in which R$_1$ and R$_2$ stand for a C$_{1-10}$ alkyl group independently of one another, or can form a pyrrolidine or piperidine ring together with the amino nitrogen. 4-Dimethylaminopyridine is preferred.

The pyridine derivatives can be prepared by the method described in Synthesis, 844, (1978).

Based on 100 moles of dicarboxylic acid used, 0.1 to 10 moles, preferably 0.2 to 5 moles of the phosphorus compound and optionally of the 4-dialkylaminopyridine is used in each case. The polycondensation is carried out at a temperature between 180° and 300° C., preferably between 200° and 260° C.

Ordinarily the procedure is carried out under inert gas at normal pressure. However, if it should be desirable for any reason, it can also be carried out with slightly reduced or raised pressure. The reaction times necessary for the production of products of adequately high molecular weight are generally between 1 to 4 hours. Distinctly longer times may also be necessary only in the case of very sluggishly reactive starting materials.

The preferred reaction medium is polar aprotic organic solvents that are able to dissolve the starting materials and also the polymeric amides sufficiently at least at 180° C. Examples of suitable solvents are N-methyl-2-pyrrolidone (NMP), N-methyl-3-caprolactam, N,N-dimethylacetamide, dimethyl sulfoxide, diphenyl sulfone, and especially sulfolane (tetrahydrothiophene dioxide). These solvents can be used alone or as mixtures. Examples of other solvents that can be used in combination with the polar aprotic solvents mentioned above are chlorobenzene, dichlorobenzene, nitrobenzene, diphenyl ether, anisole, phenol, and m-cresol. The proportion of aprotic polar solvents in these mixtures should be at least 20 wt. %.

The process is preferably carried out in the following way. A solution of approximately equimolar quantities of aromatic dicarboxylic acid and diamine is heated in the presence of the phosphorus compound and a 4-dialkylaminopyridine with a solids concentration of 5 to 50 wt. % in an inert gas atmosphere at temperatures between 200° and 260° C. This temperature is maintained for 1 to 3 hours, and the polyamide is then isolated by the usual procedures.

To prepare products with adequately high molecular weights, it is necessary to remove from the reaction system the water formed during the polycondensation. Ordinarily, it is sufficient for this purpose to pass the inert gas through the mixture. However, vacuum can also be applied and/or a portion of the solvent can be removed together with the water by (azeotropic) distillation.

At the end of the polycondensation, a more or less viscous solution or suspension of the polymer in the solvent used is obtained. The isolation of the aromatic polyamides from these solutions or suspensions is not critical; they can either by processed directly or can optionally be precipitated after dilution by adding precipitants.

Useful precipitants are the lower alcohols such as methanol, ethanol, and isopropanol, ketones such as acetone and methyl ethyl ketone, or water, or their mixtures.

2. Condensation in the melt

The process of condensation in the melt conforms to the customary process for the production of polyamide-6,6. In this case, a salt of the dicarboxylic acid and the diamine is first prepared in alcohol solution, and is isolated. The salt is then heated at normal pressure, while passing a vigorous stream of inert gas above or through the reaction mixture and removing water in this way. The polycondensation can also be carried out at elevated pressure, for example in an autoclave.

3. Polycondensation by reaction between an aromatic dicarboxylic acid dichloride and a diamine.

This process is described, for example, in German Patent Application Disclosure Nos. 19 08 297 and 30 06 899 and in J. Polym. Sci. XL, 343 (1959) and J. Polym. Sci. B, 2–4, 369 (1964).

If not otherwise indicated, the reduced viscosity $(n_{rel}-1)/C$ was determined in mixtures of 50 volume-percent phenol and 50 volume-percent dichlorobenzene at 25° C.

Other features of the invention will become apparent in the course of the following descriptions of exemplary embodiments which are given for illustration of the invention and are not intended to be limiting thereof.

EXAMPLES

EXAMPLE 1

A mixture of

| | |
|---|---|
| 7 g | phenoxyterephthalic acid, |
| 2.96 g | m-phenylenediamine, |
| 0.17 g | 50% aqueous $HPO_2$, |
| 0.17 g | 4-dimethylaminopyridine, and |
| 20 ml | sulfolane | is heated in a flask with stirring in a nitrogen atmosphere first to 1 hour at 230° C. and then for 2 hours at 250° C. The viscous reaction mixture cooled to 180° C. is diluted with 100 ml of N-methylpyrrolidone. After 30 minutes the reaction mixture is allowed to cool to room temperature and is poured into 2000 ml of methanol with vigorous stirring. The precipitated polymer is washed with hot methanol and dried under vacuum at a temperature of 100° C.

8.5 g of a yellow powder is obtained in a yield of 95%. The glass transition temperature Tg is 229° C. The reduced viscosity is 0.72 dl/g.

The polymer is dissolved in dimethylacetamide. A light yellow, transparent film is obtained from this solution.

By compression molding at 280° C. and 50 bar, a light yellow press plate 90 mm long, 15 mm wide, and 1 mm thick is obtained within 5 minutes.

EXAMPLE 2

Similarly to Example 1,

| | |
|---|---|
| 7 g | phenoxyterephthalic acid, |
| 0.89 g | p-phenylenediamine, |
| 3.84 g | 4,4'-diaminodiphenyl ether, |
| 0.17 g | 50% aqueous $H_3PO_2$ |
| 0.17 g | 4-dimethylaminopyridine, and |
| 20 ml | sulfolane | are reacted. 10.6 g of a white powder with a glass transition temperature of 203° C. is obtained in a yield of 99%. The reduced viscosity is 1.40 dl/g.

From solutions of the polymer in N-methylpyrrolidone or dimethyoacetamide, light yellow transparent films are obtained. A light yellow press plate is obtained by compression molding as in Example 1.

EXAMPLE 3

To a solution of 20 g of calcium chloride in 140 ml of N-methylpyrrolidone are added 1.83 g of p-phenylenediamine and 1.83 g of m-phenylenediamine, and this mixture is cooled to 0° C. 10 g phenoxyterephthaloyl chloride is added to this mixture with vigorous stirring. The stirring is continued for 12 hours longer at room temperature. The reaction mixture is then poured into an excess of cold water, whereupon a precipitate is formed that is washed twice with 1-liter portions of hot water and hot methanol, and is then dried under vacuum at 80° C. 10.5 g of a yellow powder with a glass transition temperature of 229° C. is obtained in a yield of 94%. The reduced viscosity is 0.50 dl/g. Compression molding under the same conditions as in Example 1 provides a press plate with similar properties.

EXAMPLE 4

To a solution of 10 g of phenoxyterephthalic acid in 350 ml of absolute ethanol is added dropwise a solution of 4.6 g of hexamethylenediamine in 50 ml of ethanol, and the mixture is stirred for 30 minutes at 50° C. The precipitated salt is filtered while hot, washed 3 times with fresh ethanol, and dried under vacuum. 14.5 g of a white salt with a melting point of approximately 270° C. is obtained. The salt is placed in a flask in a nitrogen atmosphere as pure as possible, it is heated for 1 hour at 270° C., for 3 hours at 280° C., and it is then removed from the flask as rapidly as possible. A transparent polymer is obtained with a glass transition temperature of 108° C. and a reduced viscosity of 0.68 dl/g. Compression molding at 200° C. and 50 bar provides a light yellow, transparent press plate within 5 minutes.

EXAMPLE 5

A mixture of

| | |
|---|---|
| 15 g | phenoxyterephthalic acid, |
| 12.5 g | bis(4-aminocyclohexyl)methane, |
| 0.36 g | 50% aqueous H$_3$PO$_2$, |
| 0.36 g | 4-dimethylaminopyridine, and |
| 60 ml | sulfolane | is placed in a flask and heated under nitrogen for 1 hour at 230° C. and for 45 minutes at 250° C.

The viscous reaction mixture cooled to 180° C. is diluted with 200 ml of N-methylpyrrolidone. After 30 minutes, the reaction mixture is allowed to cool to room temperature and is poured into 4 liter of cold water. The precipitate is washed with 1 liter of hot water and 1 liter of hot methanol and is dried under vacuum at 90° C. 24 g of a white granular material is obtained in a yield of 96%, with a glass transition temperature of 206° C. and a reduced viscosity of 1.58 dl/g. Compression molding under the same conditions as in Example 1 provides a transparent press plate.

EXAMPLE 6

A mixture of

| | |
|---|---|
| 10 g | phenoxyterephthalic acid, |
| 5.4 g | m-xylylenediamine, |
| 0.24 g | 50% aqueous H$_3$PO$_2$ |
| 0.24 g | 4-dimethylaminopyridine, and |
| 70 ml | sulfolane | under nitrogen is held first at 230° C. for 2 hours and then at 250° C. for 1 hour. The viscous reaction mixture cooled to 180° C. is diluted with 120 ml of N-methylpyrrolidone. After 30 minutes, the mixture is allowed to cool to room temperature, and is then poured into cold water, and the precipitate is washed twice with hot water and hot methanol. After drying under vacuum at 90° C., 13 g of a light yellow polymeric granular material obtained in a yield of 95%. The glass transition temperature is 146° C. and the reduced viscosity is 1.66 dl/g.

EXAMPLE 7

A solution of 5 g of phenoxyterephthalic acid chloride in 50 ml of dichloromethane is placed in a 200 ml flask. A solution of 2.4 g of m-xylylenediamine and 3.8 g of sodium carbonate in 50 ml of water is added slowly dropwise to the surface of the organic phase. The film forming immediately at the interface between the two phases is drawn off and washed with boiling acetone. The white product isolated after drying at 90° C. has a glass transition temperature of 145° C. Its reduced viscosity measured in concentrated sulfuric acid at 25° C. is 1.32 dl/g.

Obviously, numerous modifications and variations of the present invention are possible in light of the above teachings. It is therefore to be understood that within the scope of the appended claims, the invention may be practiced otherwise than as specifically described therein.

What is claimed as new and desired to be secured by Letters Patent of the United States is:

1. A polyamide having structural units of the formula

in which Ar is a divalent group of the formula

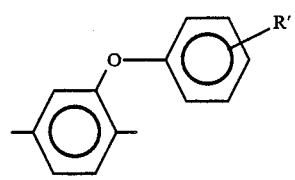

in which R is a straight-chain, branched or cyclic alkylene group with 2 to 20 carbon atoms or a divalent aromatic group of the formula

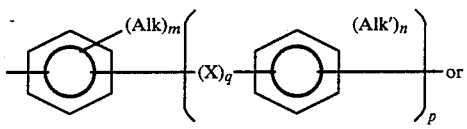

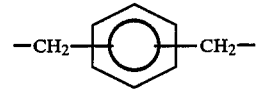

wherein Alk and Alk' are, independently, alkyl groups with up to 6 carbon atoms, X is a divalent group selected from the group consisting of —O—, —S—, —CH$_2$—, —C(CH$_3$)$_2$—, —CO—, and —SO$_2$—, and p and q are, independently, 0 or 1, and m and n are, independently, 0, 1 or 2, and in which R' is hydrogen, a halogen, an alkyl, aryl, alkoxy, or aryloxy group, each with up to 12 carbon atoms.

2. The polyamide of to claim 1, wherein R is the meta-phenylene group.

3. The polyamide of claim 1, wherein R is the group.

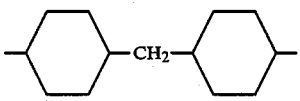

* * * * *